United States Patent [19]

Sellakumar

[11] Patent Number: 5,148,669
[45] Date of Patent: Sep. 22, 1992

[54] DETECTION OF PARTICULATES IN A HOT GAS FLOW

[75] Inventor: Karukkampalayam M. Sellakumar, San Diego, Calif.

[73] Assignee: A. Ahlstrom Corporation, Karhula, Finland

[21] Appl. No.: 609,518

[22] Filed: Nov. 5, 1990

[51] Int. Cl.$^5$ .................... F02G 3/00; B01D 53/30; B01D 45/08
[52] U.S. Cl. .................... 60/39.092; 55/270; 55/274; 55/394; 55/462
[58] Field of Search .............. 55/270, 274, 462, 394; 60/39.464, 39.092

[56] References Cited

U.S. PATENT DOCUMENTS

| | | | |
|---|---|---|---|
| 4,304,492 | 12/1981 | Fox | 356/439 |
| 4,531,402 | 7/1985 | Reif et al. | 55/270 |
| 4,568,365 | 2/1986 | Metcalfe et al. | 55/290 |
| 4,961,389 | 10/1990 | Pillsbury | 63/39.464 |

Primary Examiner—Richard A. Bertsch
Assistant Examiner—Howard R. Richman
Attorney, Agent, or Firm—Nixon & Vanderhye

[57] ABSTRACT

An apparatus is provided for ensuring that a device—such as a gas turbine—that utilizes gases and will be damaged by particles in the gases greater than the predetermined size, will not be subjected to such particles. A filter, or the like removes particles from the gases, and is connected to the gas utilization device, with a particle concentrating device disposed between the particle remover and turbine. A particle detector is associated with the particle concentrator for detecting an undesirable level of particles above the predetermined size, and an alarm or other device is activated by the particle detecting means in response to an aberrant condition. The particle concentrator comprises a first conduit extending to a branch section, and branching to a second conduit and a third conduit. The second conduit, which may be blind, is a substantial continuation of the first conduit, while the third conduit makes an angle (e.g. about 90°) with respect to the second conduit that is large enough that the vast majority of particles in the first conduit having a size greater than the predetermined size will flow into the second conduit, while gas and smaller particles will flow into the third conduit. The detector may be signal transmitter and receiver, an impact force sensing device, or a filter in the second conduit with a differential pressure sensor for sensing the pressure difference on opposite sides of the filter.

10 Claims, 2 Drawing Sheets

DETECTION OF PARTICULATES IN A HOT GAS FLOW

BACKGROUND AND SUMMARY OF THE INVENTION

There are many situations in which it is important to be able to accurately detect particles above a predetermined size in a gas stream since a gas utilization device downstream of the detector will be damaged if encountered by a gas stream with particles. One particularly illustrative example of this is a gas turbine which utilizes hot combustion gases in order to do the mechanical work, generate electricity, or the like.

Gas turbines are particularly sensitive to particles in the hot combustion gas stream. Even a small number of particles over 10 micrometers in size will quickly damage a turbine blade, which not only requires replacement of the blade, but can shut down an entire facility for a significant period of time. For that reason, a wide variety of different particle separators have been devised, such as filters, centrifugal separators, and the like, which remove the particles before they get to the turbine. If the particle separator breaks down or is damaged, however, or a sudden change in the fuel causes differences in the particle load, potentially damaging particles can move past the particle separator, which will damage the turbine.

No known systems are in existence which will reliably determine the change in the quality of the stream of gases from a combustion facility to the turbine downstream of the particle separator. Conventional particle detecting or measuring devices typically are not capable of detecting small amounts of fine particles in large flows of gas, such as exist downstream of the particle separators in the flow of hot combustion gases to a turbine. Conventional detection systems may cause false alarms, or simply inadequately determine when potentially damaging particles (e.g. with a size greater than about 10 micrometers) flow in a post-particle separator gas stream.

According to the present invention, it is possible to adequately detect—and then take appropriate corrective action—when particles larger than a predetermined size are passing in a post-particle separator stream to a gas utilization device, such as a gas turbine. This is accomplished, according to the invention, by providing a particle concentrating means disposed between the particle separator and the gas utilization device, and providing a particle detecting means associated with the particle concentrating means. In response to the particle detecting means, an activity will be initiated which prevents damage to the gas utilization device, such as activating an alarm whereby an operator takes corrective action, putting an alternative/substitute particle separator on line, shutting down the combustor, etc.

According to the present invention, the particle concentrating means preferably comprises a generally linear first conduit extending to a branch section, and at the branch section the first conduit branches into second and third conduits. The second conduit is a substantial continuation of the first conduit, while the third conduit makes an angle with respect to the second conduit that is large enough that the vast majority of the particles in the first conduit having a size greater than the predetermined size will flow into the second conduit, while gas and primarily only particles having a size less than the predetermined size will flow into the third conduit. Typically the angle between the first and third conduits is about 90°.

The second conduit may either be a blind conduit, or may have a restricted flow of gas therethrough. Particularly where it is a blind conduit, a piezoelectric device may be mounted on the end termination of the second conduit. Alternatively, whether in a blind conduit or one with restricted flow, a signal transmitter and receiver may be disposed on opposite sides of the second conduit for detecting particles therein. Where the second conduit has restricted flow, a filter may be disposed therein and a differential pressure sensing means being provided for sensing the pressure differential of opposite sides of the filter. In this latter case, the restricted flow of gas which passes through the filter may be connected up to the gas turbine, or other device for utilization of clean gas.

According to another aspect of the present invention, a method of preventing damage to a device for utilizing gases that is easily damaged by particles of greater than a predetermined size (which size of particles is difficult to detect in non-concentrated form) is provided. The method comprises the steps of essentially sequentially: (a) Effecting removal of particles greater than the predetermined size from a gas stream. (b) Concentrating any particles greater than the predetermined size that remain in the gas stream. (c) Detecting the level of concentrated particles greater than the predetermined size. And, (d) in response to step (c) initiating activities that prevent damage to the gas utilization device. Step (d) is preferably practiced by activating an alarm. Where the gas utilization device is a gas turbine operated by hot combustion gases, steps (a)-(c) are practiced to remove, concentrate, and detect particles having a size of about 10 micrometers or greater. Steps (b) and (c) are preferably practiced utilizing the concentrating and detecting devices described above.

The invention also relates to an assembly for generating and using hot combustion gases. In particular the assembly may comprise: Means for combusting fuel to produce hot combustion gases having particles therein. Means for removing particles greater than a predetermined size from the hot combustion gases. A conduit extending from the particle removing means, and having a generally linear first section. A conduit second section comprising a restricted flow continuation of the first section; A conduit third section disposed at approximately a 90° angle with respect to the first section and the second section. A turbine operatively connected to the conduit third section. And, particle detecting means operatively associated with the conduit second section.

It is the primary object of the present invention to provide effective protection for a gas utilization device that is susceptible to damage from particles greater than a predetermined size which flow in unconcentrated form in a large volume of gas. This and other objects of the invention will become clear from an inspection of the detailed description of the invention, and from the appended claims.

DETAILED DESCRIPTION OF THE DRAWINGS

Figure 1:
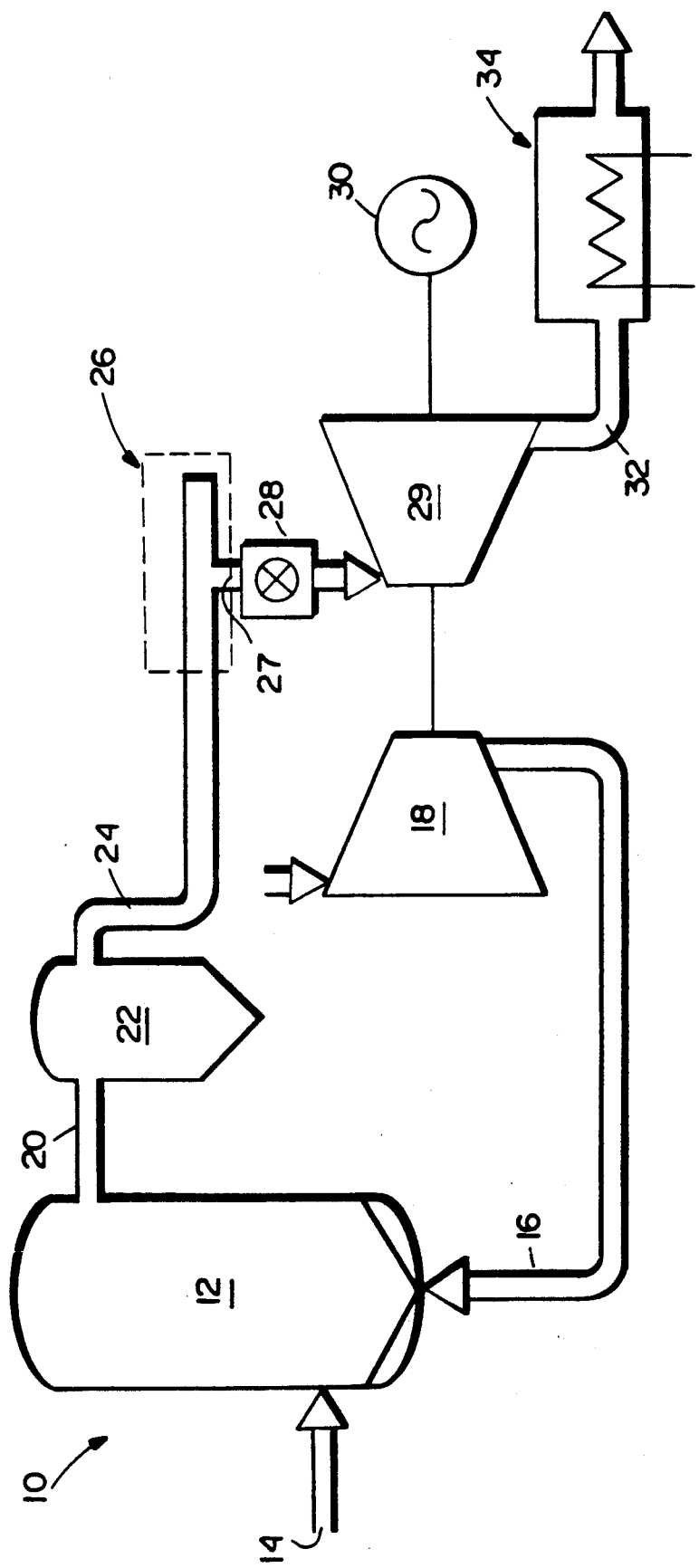
FIG. 1 is a side schematic view of an exemplary assembly according to the present invention.

An exemplary assembly 10 illustrated in FIG. 1 comprises a gasifier system in which hot combustion gases are created and utilized. While in the preferred embodiment the invention will be described with respect to combustion gases and a gas turbine, it is to be understood that other gas utilization devices besides a gas turbine may be encompassed within the invention, and that the gases need not be hot combustion gases, but may be other types of gases in which there is a relatively large volume of gas that is relatively clean, but if the stream does contain particles greater than a predetermined size disastrous consequences may ensue.

The system 10 includes a conventional reactor chamber 12 having an inlet 14 for fuel, and an air inlet 16. The fuel introduced in inlet 14 may be coal, peat, bark, wood products, or a wide variety of other fuels. The air in inlet 16 preferably is compressed, as by a compressor 18 which compresses ambient air. Hot gases or hot combustion generated gases from the reactor chamber 12 are discharged in conduit 20, and pass to a particle separator 22. The temperature of the gases from the gasifier or hot gas generator 12 are typically about 400°-1100° C. (e.g. 850°-1100° C.) The separator 22 may be any suitable conventional particle separator, such as a ceramic filter, an el-filter, a series of centrifugal separators, etc. Clean gas from the separator 22 passes in first conduit 24 through a particle concentrating and detecting system 26, ultimately passing in duct 27 and/or into the combustion chamber 28 of a gas turbine 29. In the preferred embodiment illustrated in FIG. 1, a gas turbine 29 not only powers the compressor 18, but runs a generator 30. Exhaust gases from the gas turbine are led through duct 32 into a waste heat boiler 34.

Normally the flow rate of the relatively clean gas in the conduit 24 is so high that conventional equipment will not accurately detect a small quantity of particles greater than a predetermined size which may damage the blades of the turbine 29. That is if the gas flow in the conduit 24 has particles greater than about 10 micrometers in size (or other predetermined size), unless those particles are sufficiently concentrated they will not be detected, and will pass to the turbine 29 and effect damage. It is only an aberrant condition when the gas will have particles greater than this predetermined size, which may ensue from the particle separator 22 malfunctioning.

Figure 2:
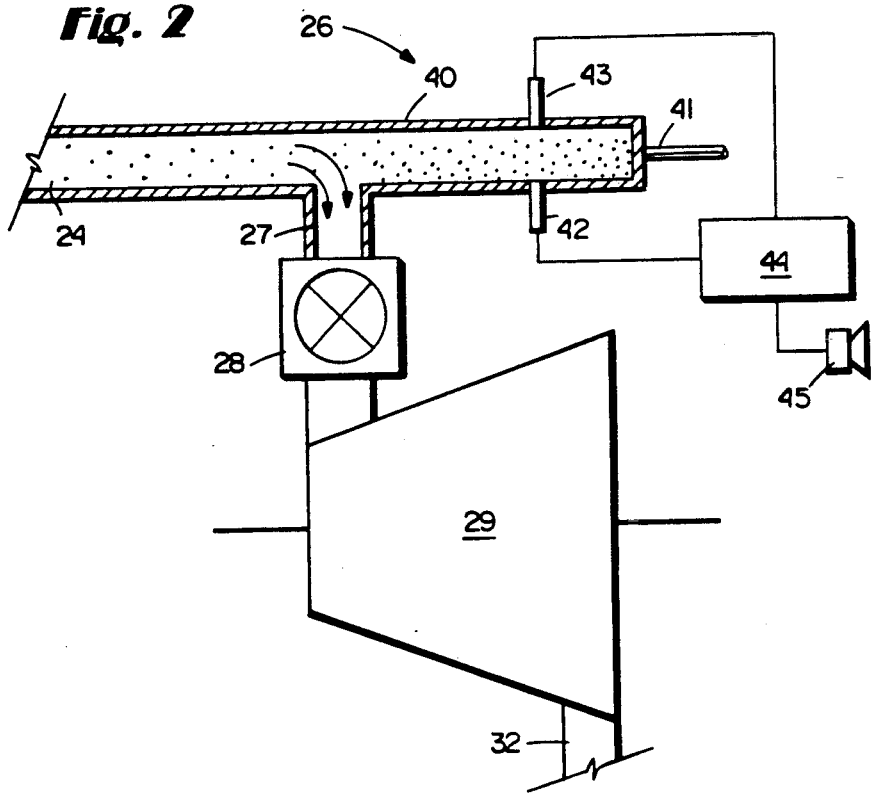
FIG. 2 is a side schematic view, partly in cross-section and partly in elevation, of particular particle concentrating and detecting means according to the one embodiment of the present invention.

The preferred form of the concentrating means part of the concentrating and detecting means 26 according to the invention comprises a second conduit 40 which is substantially a linear continuation of a generally linear section of the conduit 24 (see FIG. 2), with the duct 27 comprising a third conduit which is disposed at a large angle with respect to the conduit 24. As illustrated in FIG. 2, preferably the conduit 27 makes an angle of about 90° with respect to the conduit 24, however the angle may be significantly less or more than 90°. It is merely desirable that the angle be such that due to their momentum, particles greater than the predetermined size (e.g. 10 micrometers) will continue to flow from first conduit 24 straight into the second conduit 40, which is an extension of the first conduit 24, while the vast majority of the gas, with any smaller particles therein, will make the sharp bend in the branch of the conduit 24, and flow to the turbine 29.

Figure 3:
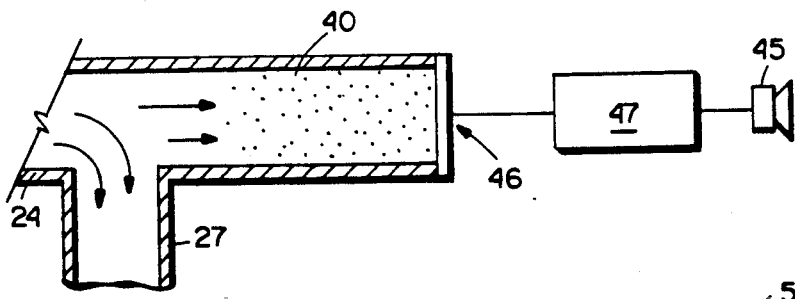
FIG. 3 is a view like that of FIG. 2 for a second embodiment of detecting means.

Associated with the second conduit 40 is a particle detection means. As illustrated in FIG. 2, the second conduit 40 may have a restricted gas flow through smaller diameter line 41 extending from the end of second conduit 40, or as illustrated in FIG. 3 the second conduit 40 may be blind. In the FIG. 2 embodiment, the particle detecting means comprises a conventional signal transmitter 42 and a signal receiver 43 which are operatively connected to control components thereof. If the signal from the transmitter 42 to the receiver 43 encounters particles of sufficient size and concentration, the device 45—which comprises means responsive to the detecting means 42-44—will initiate activity which prevents damage to the turbine 29. In the embodiment illustrated in FIG. 2, the means 45 is indicated as an alarm, particularly a horn. Of course a wide variety of other or additional types of alarms, such as flashing lights, etc., may be provided. Alternatively instead of activating an alarm—or in addition to activating an alarm—various aspects of the process may be controlled, for example automatically directing the flow of gas in conduit 20 to an alternative or additional particle separator, slowing down the combustion, taking the turbine off line and venting the gas, etc.

FIG. 3 illustrates another embodiment of the particle detecting means that may be utilized in association with the second conduit 40. In this case the second conduit 40 is blind, and a large particle impact sensing device—such as a piezoelectric device 46—is mounted at the end termination of the second conduit 40. The piezoelectric device 46 is connected up to a suitable control 47. When an undesirable level of particles of the predetermined size collect in the second conduit 40, the control 47 will activate the horn 45, or the like.

Figure 4:
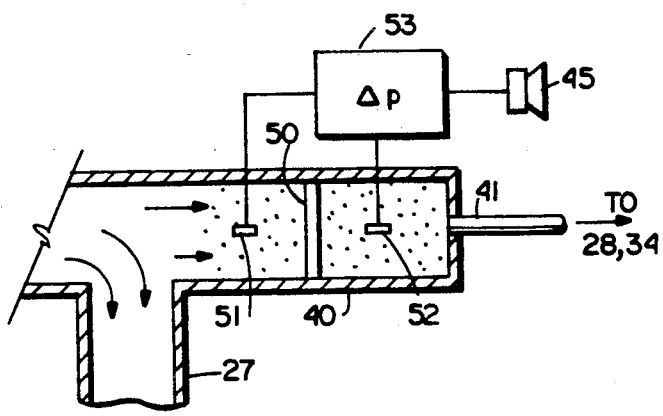
FIG. 4 is a view like that of FIG. 3 for a third embodiment of detecting means.

FIG. 4 illustrates another embodiment of the particle detecting means according to the invention. In this embodiment, gas typically flows—in a restricted manner—through second conduit 40, into reduced diameter conduit 41. Disposed within the second conduit 40 is a filter 50 if that portion of the gas falling into the conduit 40 has particles greater than the predetermined size therein, they will be filtered out by the filter 50, which will cause a pressure differential to occur across the filter 50. Pressure is sensed by pressure sensing elements 51, 52 disposed on opposite sides of the filter 50 in the second conduit 40, with a controller 53 sensing the differential pressure, and activating an alarm 45 or the like if the differential pressure exceeds a predetermined amount. In this embodiment, since the gas in line 41 will always be clean, that gas may be led directly to the combustor 28 or a hot gas duct of the turbine 29, or to the waste heat boiler 34, or it may be directed to another suitable gas utilization device.

It should be noted that while the arrangement of the conduits 24, 27, 40 is such that a large number of the particles greater than a predetermined size will be concentrated in the second conduit 40, of course it cannot operate with complete efficiency, therefore some particles will pass in the conduit 27, although typically so few that no significant damage will be done to the turbine 29 before the presence of the particles is made known by the device 45, and corrective action is taken.

Utilizing the system and apparatus 10 heretofore described, according to the invention a method of preventing damage to a gas utilization device (such as turbine 29) that is easily damaged by particles of greater than a predetermined size, which size of particles is difficult to detect in non-concentrated form, is provided. The method comprises the steps of essentially sequentially: (a) Effecting removal of particles greater than the predetermined size from a gas stream and conduit 20, utilizing particle separator 22. (b) Concentrating any particles greater than the predetermined size remaining in the gas stream by utilizing the branch in the conduit 24, the second conduit, continuation, 40 receiving the majority of the oversized particles, while gas and the smaller particles flow in third conduit 27 to the turbine 29. (c) Detecting the level of concentrated particles greater than the predetermined size in the second conduit 40, utilizing the transmitter receiver assembly 42-43, the piezoelectric device 46, or the filter 50 and pressure differential sensors 51-53. And, (d) in response to step (c) initiating activities that prevent damage to the gas utilization device 29, e.g. by activating horn 45, or another alarm, or by directing the flow of gas in conduit 20 to another or additional particle separator, cutting off the fuel supply to the combustor 12, venting the conduit 27, or otherwise controlling the process conditions. The sharp bend provided in the branch of the conduit 24 by the third conduit 27 ensures that most of the particles greater than the predetermined size (e.g. about 4-10 micrometers) will pass into the concentrating conduit 40, not to turbine 29.

It will thus be seen that according to the present invention an apparatus and method have been provided for effectively utilizing gases while preventing damage to the gas utilization device which is easily damaged by particles in the gases greater than a predetermined size. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent structures and methods.

What is claimed is:

1. An assembly for creating and using hot combustion gases, comprising:
   means for combusting fuel to produce hot combustion gases having particles therein;
   means for removing particles greater than a predetermined size from the hot combustion gases;
   a conduit extending from said particle removing means, and having a generally linear first section;
   a conduit second section comprising a restricted flow continuation of said first section;
   a conduit third section disposed at approximately a 90° angle with respect to said first section and said second section;
   a turbine operatively connected to said conduit third section; and
   particle detecting means operatively associated with said conduit second section.

2. Apparatus for utilizing gases, comprising:
   (a) means for removing particles from gases in a gas stream;
   (b) means susceptible to damage from particles greater than a predetermined size in the gases, for utilizing the gases;
   (c) particle concentrating means for concentrating the number of particles above the predetermined size per unit of volume, said particle concentrating means disposed between said means (a) and (b), and comprising: a generally linear first conduit extending to a branch section; at said branch section, said first conduit branching into second and third conduits, said second conduit being a substantial continuation of said first conduit, and said third conduit making an angle with respect to said second conduit that is large enough that the vast majority of particles in said first conduit having a size greater than the predetermined size will flow into said second conduit, while gas and primarily only particles having a size less than the predetermined size will flow into said third conduit;
   (d) particle detecting means associated with said particle concentrating means for detecting an undesirable level of particles above the predetermined size; and
   (e) means responsive to said means (d) initiating activity which prevents damage to said means (b) when an undesirable level of the particles is detected.

3. Apparatus as recited in claim 2 wherein said means (b) comprises a turbine, and wherein said predetermined size is about 4-10 micrometers.

4. Apparatus as recited in claim 2 wherein said second conduit has first and second, opposite, sides, and wherein said means (d) comprises a signal transmitter and receiver disposed on said sides of said second conduit, for detecting the physical presence of particles in said second conduit.

5. Apparatus as recited in claim 4 wherein said second conduit is closed at the end thereof opposite said first conduit.

6. Apparatus as recited in claim 2 wherein said second conduit has an end termination spaced a small distance from said first conduit, and wherein said means (d) comprises an impact force sensing device at said end termination.

7. Apparatus as recited in claim 2 wherein said means (d) comprises a filter disposed in said second conduit, and differential pressure sensing means for sensing the pressure differential of opposite sides of said filter.

8. Apparatus as recited in claim 7 further comprising a smaller diameter continuation of said second conduit on the opposite side of said filter from said first conduit, said continuation operatively connected to a device for utilization of clean gas.

9. Apparatus as recited in claim 2 wherein said means (e) comprises an alarm.

10. Apparatus as recited in claim 2 wherein said second and third conduits make an angle of approximately 90° with respect to each other.

* * * * *